United States Patent
Xiao et al.

(10) Patent No.: US 10,769,494 B2
(45) Date of Patent: Sep. 8, 2020

(54) ENHANCED TRAINING INFORMATION GENERATION

(71) Applicant: Pony AI Inc., Fremont, CA (US)

(72) Inventors: Bo Xiao, San Jose, CA (US); Yiming Liu, San Jose, CA (US); Sinan Xiao, Mountain View, CA (US); Xiang Yu, Santa Clara, CA (US); Tiancheng Lou, Milpitas, CA (US); Jun Peng, Fremont, CA (US); Jie Hou, Fremont, CA (US); Zhuo Zhang, Fremont, CA (US); Hao Song, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 167 days.

(21) Appl. No.: 15/949,932

(22) Filed: Apr. 10, 2018

(65) Prior Publication Data

US 2019/0311226 A1    Oct. 10, 2019

(51) Int. Cl.
| | | |
|---|---|---|
| *G06N 20/20* | (2019.01) | |
| *G06K 9/62* | (2006.01) | |
| *G05D 1/02* | (2020.01) | |
| *G06N 20/00* | (2019.01) | |

(52) U.S. Cl.
CPC ......... *G06K 9/6256* (2013.01); *G05D 1/0221* (2013.01); *G06N 20/00* (2019.01); *G06K 2209/23* (2013.01)

(58) Field of Classification Search
CPC .. G06K 9/6256; G06K 2209/23; G06N 20/00; G05D 1/0221
See application file for complete search history.

(56) References Cited

U.S. PATENT DOCUMENTS

| | | |
|---|---|---|
| 5,717,406 A | 2/1998 | Sanderford et al. |
| 8,131,012 B2 * | 3/2012 | Eaton ............... G08B 13/19608 382/103 |
| 8,704,653 B2 | 4/2014 | Seder et al. |
| 9,652,980 B2 | 5/2017 | Zhang et al. |
| 10,460,600 B2 * | 10/2019 | Julian ...................... G06K 9/46 |
| 2019/0101914 A1 * | 4/2019 | Coleman, II ......... G08G 1/0129 |
| 2019/0311226 A1 * | 10/2019 | Xiao ..................... B60W 30/00 |

* cited by examiner

*Primary Examiner* — Gregory M Desire
(74) *Attorney, Agent, or Firm* — Sheppard Mullin Richter & Hampton LLP (57) ABSTRACT

Systems, methods, and non-transitory computer readable media configured to generate enhanced training information. Training information may be obtained. The training information may characterize behaviors of moving objects. The training information may be determined based on observations of the behaviors of the moving objects. Behavior information may be obtained. The behavior information may characterize a behavior of a given object. Enhanced training information may be generated by inserting the behavior information into the training information.

20 Claims, 6 Drawing Sheets

ENHANCED TRAINING INFORMATION GENERATION

FIELD OF THE INVENTION

This disclosure relates to approaches for generating enhanced training information.

BACKGROUND

Under conventional approaches, training data (e.g., LIDAR data, images) may include observations of objects in real environments. For example, training data may include observations of vehicles on the road. However, limiting training data to real-observations of objects may result in the training data not including information on certain events, such as rare/abnormal events. For example, if a likelihood of a particular event relating to a vehicle occurring in real life is very low, then observations of the vehicle for a limited amount of time may not include an observation of the particular event. Tools that are configured using training data missing observations of events may not be prepared to deal with occurrences of unobserved events.

SUMMARY

Various embodiments of the present disclosure may include systems, methods, and non-transitory computer readable media configured to obtain training information. The training information may characterize behaviors of moving objects. The training information may be determined based on observations of the behaviors of the moving objects. Behavior information may be obtained. The behavior information may characterize a behavior of a given object. Enhanced training information may be generated by inserting the behavior information into the training information.

In some embodiments, the behavior of the given object may include a rare behavior of the given object. The rare behavior of the given object may not be characterized by the training information.

In some embodiments, the behavior information may be inserted into the training information based on a frequency of occurrence of the rare behavior of the given object.

In some embodiments, the training information may define a three-dimensional point cloud model of a scene and one or more images of the scene.

In some embodiments, the behavior information characterizing the behavior of the given object may include the behavior information defining a three-dimensional point cloud model of motions of the given object.

In some embodiments, the given object may include a person, an animal, or a vehicle.

In some embodiments, the enhanced training information may be used to train a machine learning model for controlling one or more things. For example, the machine learning model may be used to control motions of a vehicle.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

A claimed solution rooted in computer technology overcomes problems specifically arising in the realm of computer technology. In various implementations, a computing system may obtain training information. The training information may characterize behaviors of moving objects. The training information may be determined based on observations of the behaviors of the moving objects, such as based on observations of the moving objects using LIDAR and/or images of the moving objects captured using one or more image capture devices. Behavior information may be obtained. The behavior information may characterize a behavior of a given object (e.g., a person, an animal, or a vehicle). Enhanced training information may be generated by inserting the behavior information into the training information.

In some embodiments, the behavior of the given object may include a rare behavior of the given object, such as a rare behavior of the given object not characterized by the training information.

In some embodiments, the behavior information may be inserted into the training information based on a frequency of occurrence of the rare behavior of the given object. That is, how the behavior information is inserted into the training information may depend on the rate at which the rare behavior is expected to occur.

In some embodiments, the training information may define a three-dimensional point cloud model of a scene (e.g., determined using LIDAR) and one or more images of the scene (e.g., captured using image capture device(s)), and the behavior information characterizing the behavior of the given object may include the behavior information defining a three-dimensional point cloud model of motions of the given object.

In some embodiments, the enhanced training information may be used to train a machine learning model. For example, the enhanced training information may be used to train a machine learning model used to control motions of a vehicle.

The approaches disclosed herein enables generation of enhanced training information. The enhanced training information may provide information relating to behavior(s) of an object that may not be observed during generation of training information. That is, real-life observations of an object for a limited amount of time may result in one or more behaviors of the object not being observed, and the approaches disclosed herein enhances the training information with information relating to such behavior(s) of the object.

While the disclosure is described herein with respect to vehicles on the road, this is merely for illustrative purposes and is not meant to be limiting. The approach disclosed herein may be used to generate enhanced training information characterizing behavior of other objects in other locations.

Figure 1:
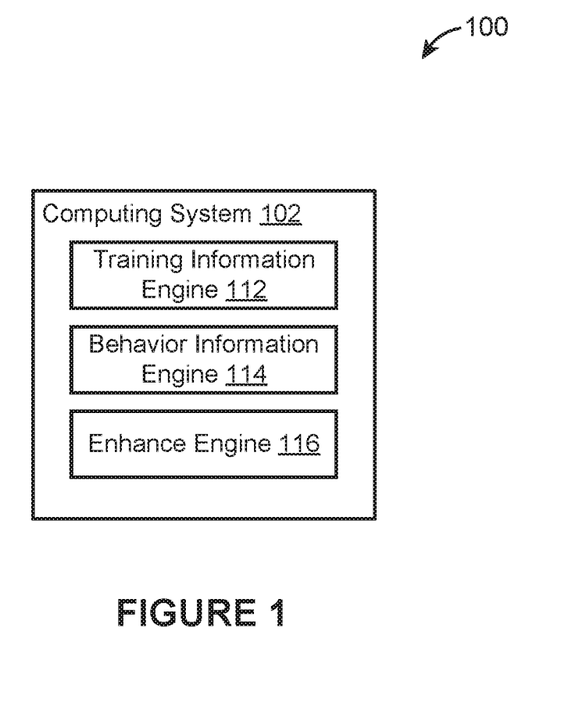
FIG. 1 illustrates an example environment for generating enhanced training information, in accordance with various embodiments.

FIG. 1 illustrates an example environment 100 for generating enhanced training information, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include a training information engine 112, a behavior information engine 114, an enhance engine 116, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices.

In various embodiments, the training information engine 112 may be configured to obtain training information. Obtaining training information may include accessing, acquiring, analyzing, determining, examining, identifying, loading, locating, opening, receiving, retrieving, reviewing, storing, and/or otherwise obtaining the training information. Training information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Training information may be stored within a single file or across multiple files. For example, particular training information may have been ingested into a database as one or more objects, and the training information engine 112 may retrieve the object(s) to obtain the training information.

Training information may characterize behaviors of moving objects. Moving objects may refer to living and/or non-living objects that may move, such as person(s), animal(s), and/or vehicle(s). Moving objects may refer to an object that may move on its own and/or objects that may be moved by other objects. Behaviors of moving objects may refer to one or more ways in which the moving object moves. Behaviors of moving objects may refer to one or more ways in which one or more portions of the moving object moves. For example, behaviors of moving objects may include ways in which the moving objects and/or portions of the moving object move translationally and/or rotationally. Behaviors of moving objects may include direction and/or speed of the moving object and/or portions of the moving objects. Behaviors of moving objects may include ways in which the moving objects move over a duration of time and/or over a distance, ways in which the moving objects stay still over a duration of time and/or at a position, ways in which the moving objects begin to move from stopped positions, ways in which the moving objects stop moving, and/or other behaviors of moving objects. Behaviors of moving objects may be associated with particular context. For example, behaviors of vehicles may be associated with location, time of occurrence, condition, and/or other context relating to particular motions. That is, a particular motion (e.g., backward motion) of a vehicle may be associated with where the particular motion takes place (e.g., parking lot, highway), when the particular motion takes place (e.g., parts of the day/month/year, season, specific time), environmental conditions around the vehicle during the particular motion (e.g., road condition, weather condition, objects surrounding the vehicle), and/or other information relating to the particular motion. An event for a moving object may include the moving object exhibiting one or more behaviors, such as moving in a particular way.

Training information may be determined based on observations of the behaviors of the moving objects and/or other information. For example, training information may be determined based on observations of moving objects using LIDAR and/or images of moving objects captured using one or more image capture devices. For instance, LIDAR readings of objects (e.g., vehicles, persons) on the road may be taken from a static position (e.g., LIDAR equipment located at a particular location) or a dynamic position (e.g., LIDAR equipment carried by a vehicle traveling on the road). The LIDAR readings may provide distance measurements of where objects are located with respect to the LIDAR equipment, which may be used to determine how the objects are moving/not moving with respect to the LIDAR equipment and/or the ground. Alternatively, or in addition, images of the objects on the road may be captured by one or more image capturing devices to provide images of the objects, and the images may be analyzed to determine how the objects are moving/not moving. In some embodiments, LIDAR readings may be used with images to determine training information. For example, LIDAR readings may provide information on how vehicles are moving/not moving while images may provide and/or be used to determine information on the identity of the vehicles, such as vehicle year, make, and model.

In some embodiments, training information may define one or more three-dimensional point cloud models of one or more scenes, one or more images of the scene(s), and/or other information relating to the scene(s). A three-dimensional point cloud model of a scene may include one or more sets of data points in a coordinate system, such as Cartesian coordinate system, polar coordinate system, cylindrical coordinate system, spherical coordinate system, and/or other coordinate systems. The location of the data points within the coordinate system (e.g., determined using LIDAR) may represent positions of one or more objects in the scene. The location of the data points within the coordinate system may represent shapes, dimensions, and/or other physical characteristics of objects and/or motions of objects in the scene. For example, different data points may represent external surfaces of one or more objects located within the scenes. A three-dimensional point cloud model of a scene may be used to determine/identify where object(s) are located within the scene and/or how the object(s) are behaving (e.g., moving) within the scene. A three-dimensional point cloud model of a scene may change based on observed motions of the object(s). That is, training information may define one or more three-dimensional point cloud models of motions of objects within one or more scenes. The image(s) of the scene may be used to identify the identit(ies) of the objects. Alternatively, or in addition, objects represented within a three-dimensional point cloud model of a scene may be labeled and/or associated with information relating to their identities.

Because the training information is determined based on observations of moving objects (e.g., using LIDAR), the training information may not characterize certain behaviors of moving objects. For example, training information determined based on observations of vehicles on the road may be limited to characterizing only behaviors of vehicles that were actually observed. Certain behaviors of vehicles, such as rare behaviors of vehicles (behaviors of vehicles that do not occur often), may not be observed at all or may only be observed after extensive observations of the vehicles have been performed. For example, the likelihood of a vehicle moving backwards on a highway (e.g., driver is backing up on the highway) may be low and observations of vehicles on the road may not include any observation of a vehicle moving backwards on the highway. Certain behaviors of vehicles, such as dangerous behaviors of vehicles, may be difficult and/or dangerous to observe. For example, a vehicle's motion in an accident may be difficult and/or dangerous to observe. Tools which are configured using the training information, such as machine learning models used to control motions of vehicles, may not be able to deal with actual occurrences of such unobserved (e.g., rare, dangerous) behaviors because the training information did not include information on such unobserved (e.g., rare, dangerous) behaviors.

In various embodiments, the behavior information engine 114 may be configured to obtain behavior information. Obtaining behavior information may include accessing, acquiring, analyzing, determining, examining, identifying, loading, locating, opening, receiving, retrieving, reviewing, storing, and/or otherwise obtaining the behavior information. Behavior information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Behavior information may be stored within a single file or across multiple files. For example, particular behavior information may have been ingested into a database as one or more objects, and the behavior information engine 114 may retrieve the object(s) to obtain the behavior information.

Behavior information may characterize one or more particular behaviors of one or more objects. Objects may refer to living and/or non-living objects, such as person(s), animal(s), and/or vehicle(s). For example, behavior information may characterize particular behaviors of one or more moving objects. Behavior information may characterize behaviors of moving objects that are not characterized by training information (e.g., obtained by the training information engine 112). For example, behavior information may characterize one or more rare behaviors of a moving object and the rare behavior(s) of the moving object may not be characterized by the training information because the rare behavior(s) were not observed during observations of moving objects. Behavior information may characterize one or more dangerous behaviors of a moving object and the dangerous behavior(s) of the moving object may not be characterized by the training information. Characterization of other behavior/other types of behavior by behavior information are contemplated.

In some embodiments, behavior information may define one or more three-dimensional point cloud models of particular behaviors (particular motions) of one or more objects. A three-dimensional point cloud model of a behavior of an object may include one or more sets of data points representing positions of the object while the object is engaged in the behavior. A three-dimensional point cloud model of a particular behavior of an object may change based on the particular motion(s) of the object. That is, the behavior information may define one or more three-dimensional point cloud models of particular motion(s) of the object. The object represented within the three-dimensional point cloud model may be labeled and/or associated with information relating to their identities and/or their behaviors.

Behavior information may be determined based on observed behaviors of one or more objects, simulated behaviors of one or more objects, and/or other information. For example, behavior information characterizing a particular behavior of an object may be determined based on a past observation of the object. For instance, the particular behavior of the object may include a rare/dangerous behavior of the object that was actually observed and a three-dimensional point cloud model of this behavior may be stored in electronic storage for use in enhancing training information. For example, a rare/dangerous behavior of a vehicle observed on a particular road may be used to enhance training information characterizing behaviors of vehicles on the same or different road and/or in other locations.

As another example, behavior information characterizing a particular behavior of an object may be simulated. For instance, the particular behavior of the object may include a rare/dangerous behavior of the object that is simulated to occur, such as by using a three-dimensional model of the object to move (or for one or more portions of the object to move) in accordance with the particular behavior and generating a three-dimensional point cloud model of this simulated behavior. That is, a simulation of a three-dimensional model of the object may be used to generate the behavior information.

As another example, behavior information characterizing a particular behavior of an object may be generated based on modification of an observed behavior or a simulated behavior. For example, behavior information that characterizes a particular observed behavior or a particular simulated behavior may be modified to generate variations on the observed/simulated behavior. For instance, an observed behavior or a simulated behavior of an object may include a truck making an erratic turn in a residential area. This behavior may be changed for use in enhancing training information. For example, the behavior may be changed to include a different object (e.g., change truck to a motorcycle), changed to include different context (e.g., different location, different time, different surrounding conditions)

and/or changed to include a different motion (e.g., change in motion of the truck, change in motion of a part of the truck, such as change in motion of a door of the truck, change in motion of a trailer attached to the truck, or change in motion of a load carried by the truck). Other changes in observed behavior and simulated behavior are contemplated.

In various embodiments, the enhance engine 116 may be configured to generate enhanced training information. The enhance engine 116 may generate enhanced training information based on behavior information, training information, and/or other information. For example, the enhance engine 116 may generate enhanced training information by inserting the behavior information into the training information. That is, the enhance engine 116 may modify the training information by inserting the behavior information obtained by the behavior information engine 114. Other combinations of training information and behavior information for generation of enhanced training information are contemplated.

The enhanced training information may characterize behaviors of moving objects. Behaviors characterized by the enhanced training information may include behaviors characterized by the training information, behaviors characterized by the behavior information, and/or other behaviors. For example, behaviors characterized by the enhanced training information may include observed behaviors of moving objects, simulated behaviors of moving objects, observed behaviors of moving objects that have been modified, and/or simulated behaviors of moving objects that have been modified. The enhanced training information may define one or more three-dimensional point cloud models of observed, simulated, and/or modified behaviors of moving objects.

In some embodiments, the enhanced training information may be generated based on a frequency of occurrence of the behavior characterized by the behavior information. For example, the behavior information may characterize a rare/dangerous behavior of an object that has a given frequency of occurrence, and the behavior information may be inserted into the training information based on the given frequency of occurrence of the rare/dangerous behavior of the object. That is, how the behavior information is inserted into (or otherwise combined with) the training information may depend on the rate at which the rare/dangerous behavior is expected to occur. For instance, a behavior that is more likely to occur than another behavior may be included more often (e.g., inserted into the training information at a greater number) than a behavior that is less likely to occur. Alternatively, or in addition, the behavior information may be inserted into (or otherwise combined with) the training information with information relating to the frequency of occurrence of the behavior.

In some embodiments, enhanced training information may be used to train one or more machine learning models. A machine learning model may refer to one or more model artifacts that is generated from machine learning training process. A machine learning model may facilitate one or more tools to learn with data without explicit programming. For example, a machine learning model may be used in one or more tools (e.g., self-driving tools) to control motions of a vehicle, and enhanced training information may be used as training data to train the machine learning model. Such training of the machine learning model may enable the tool(s) to better control motions of the vehicle, such as by better predicting behaviors (e.g., motions) of objects near the vehicle being controlled and/or better controlling how the vehicle acts in response to identifying behaviors of objects. Proper training of such machine learning models may require large amounts of training data, such as large amounts of information characterizing different behaviors of objects. Physically observing different behaviors of objects may be difficult and time consuming. Rather than training the machine learning models strictly with training information that characterizes observed behaviors of moving objects, enhanced training information that characterizes additional/other behaviors moving objects may be generated for use in training the machine learning models.

Figure 2:
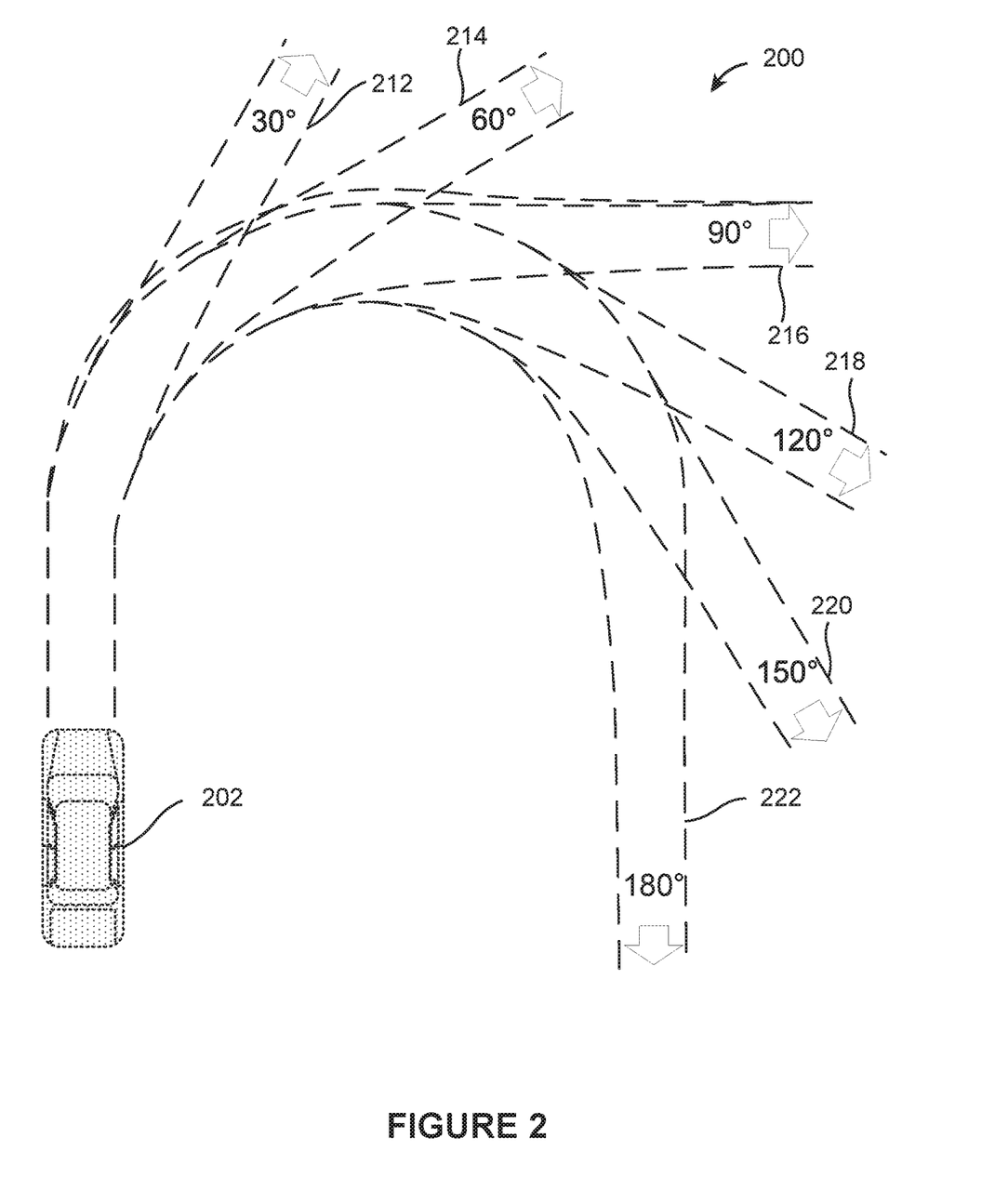
FIG. 2 illustrates example observed behaviors of a moving object, in accordance with various embodiments.

FIG. 2 illustrates example observed behaviors of a moving object, in accordance with various embodiments. Observed behaviors 200 may include behaviors of a vehicle 202 that were actually observed, such as using LIDAR and/or imaging techniques. For example, the observed behaviors 200 may include behaviors of the vehicle 202 that were observed while the vehicle 202 was on the road. The vehicle 202 may refer to a specific vehicle, a type of vehicle, and/or other groupings of vehicles. For instance, the observed behaviors 200 may include behaviors of a specific vehicle (e.g., one particular vehicle, vehicles of particular year, make, and/or model) observed on the road, behaviors of a type of vehicle (e.g., motorcycle vs truck), behaviors of vehicles in different context (e.g., location, time, condition), and/or other groupings of behaviors of vehicles.

The observed behaviors 200 may include behaviors 212, 214, 216, 218, 220, 222 of the vehicle 202 turning to the right, with individual behaviors 212, 214, 216, 218, 220, 222 characterized by different angles of turn. The behaviors 212, 214, 216, 218, 220, 222 may be associated and/or labeled with frequencies of occurrence. The frequencies of occurrence may be the same or different for different behaviors. For example, the behavior 216 may be observed to occur more frequently than the behavior 220, and the behavior 216 may be associated and/or labeled with higher frequency of occurrence than the behavior 220.

The observed behaviors 200 may be characterized by training information. The observed behaviors 200 may not include certain behaviors of the vehicle 202. For example, a rare behavior of the vehicle may not have been observed. In such a case, the training information may not characterize the unobserved (e.g., rare) behaviors of the vehicle 202. Configuring tools using training information that lacks information relating to unobserved behaviors may lead to the tools not being prepared to deal with occurrences of such behaviors. For example, configuring a self-driving tool for a vehicle with training information that lacks information relating to unobserved behaviors may lead to the self-driving tool being unable to properly control the vehicle to deal with such behaviors occurring on the road.

Figure 3:
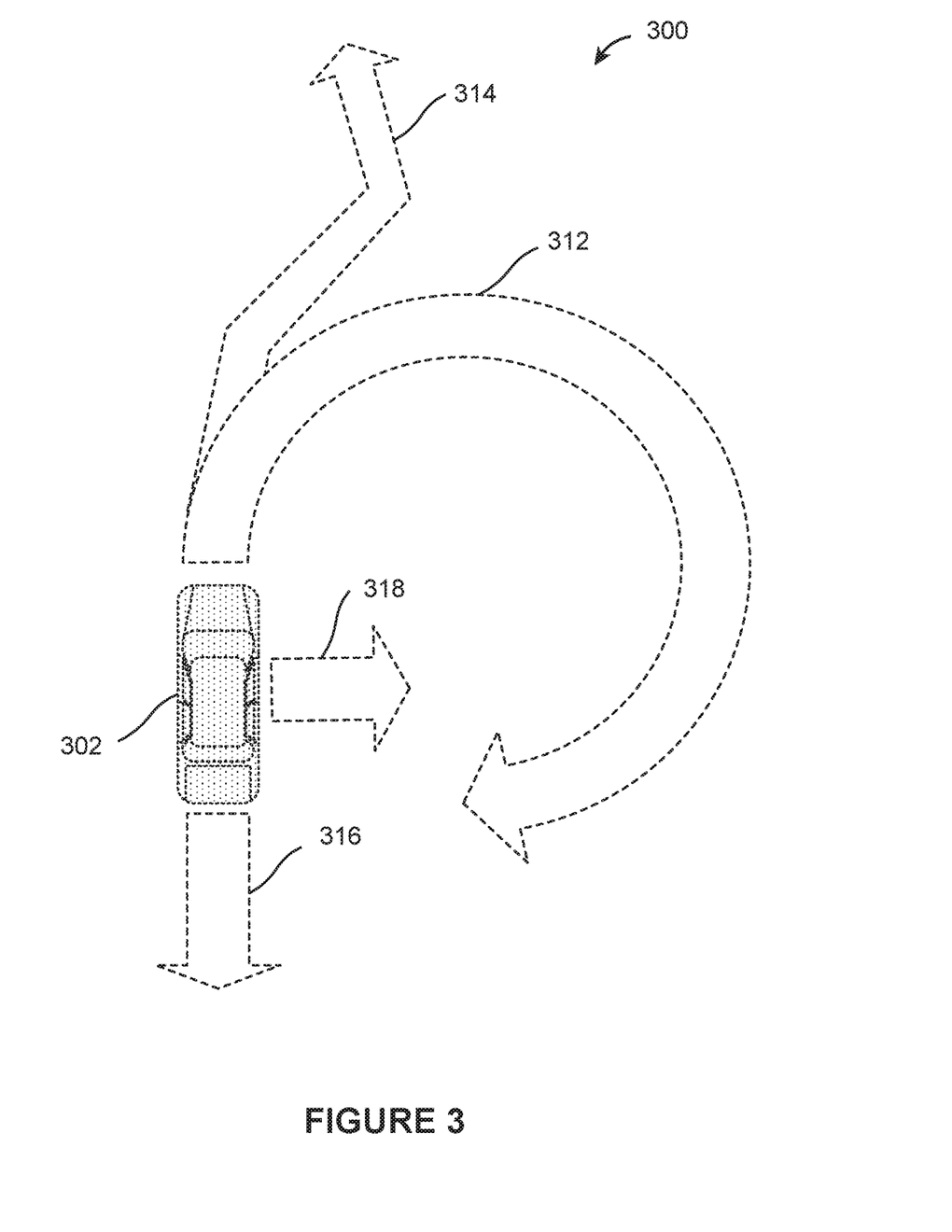
FIG. 3 illustrates example behaviors of a moving object, in accordance with various embodiments.

FIG. 3 illustrates example behaviors of a moving object, in accordance with various embodiments. Behaviors 300 may include behaviors of a vehicle 302 that were not observed in generating training information. For example, LIDAR and/or imaging techniques may have been used to observe the behaviors of the vehicle 302 on the road. The behaviors 300 may include those behaviors of the vehicle 302 that were not actually observed, such as rare and/or dangerous behaviors of the vehicle 302. For instance, observations of the vehicle 302 may not have included the vehicle 302 making a circular turn on the road (the behavior 312), the vehicle 302 zigzagging across the road (the behavior 314), the vehicle backing up on the road (the behavior 316), the vehicle moving sideways, such as from being hit from the other side, on the road (the behavior 318). Other behaviors of the vehicle 302 are contemplated. The behaviors 312, 314, 316, 318 may be associated and/or labeled with frequencies of occurrence.

The behaviors 300 may be characterized by behavior information. The behavior information may be used to enhance training information. For example, the behavior information may be used to enhance training information characterizing the observed behaviors 200 (shown in FIG. 2). The enhanced training information may characterize both observed behaviors 200 and the behaviors 300. The enhanced training information may better configure tools (e.g., self-driving tools) to deal with occurrences of the behaviors 300.

Figure 4:
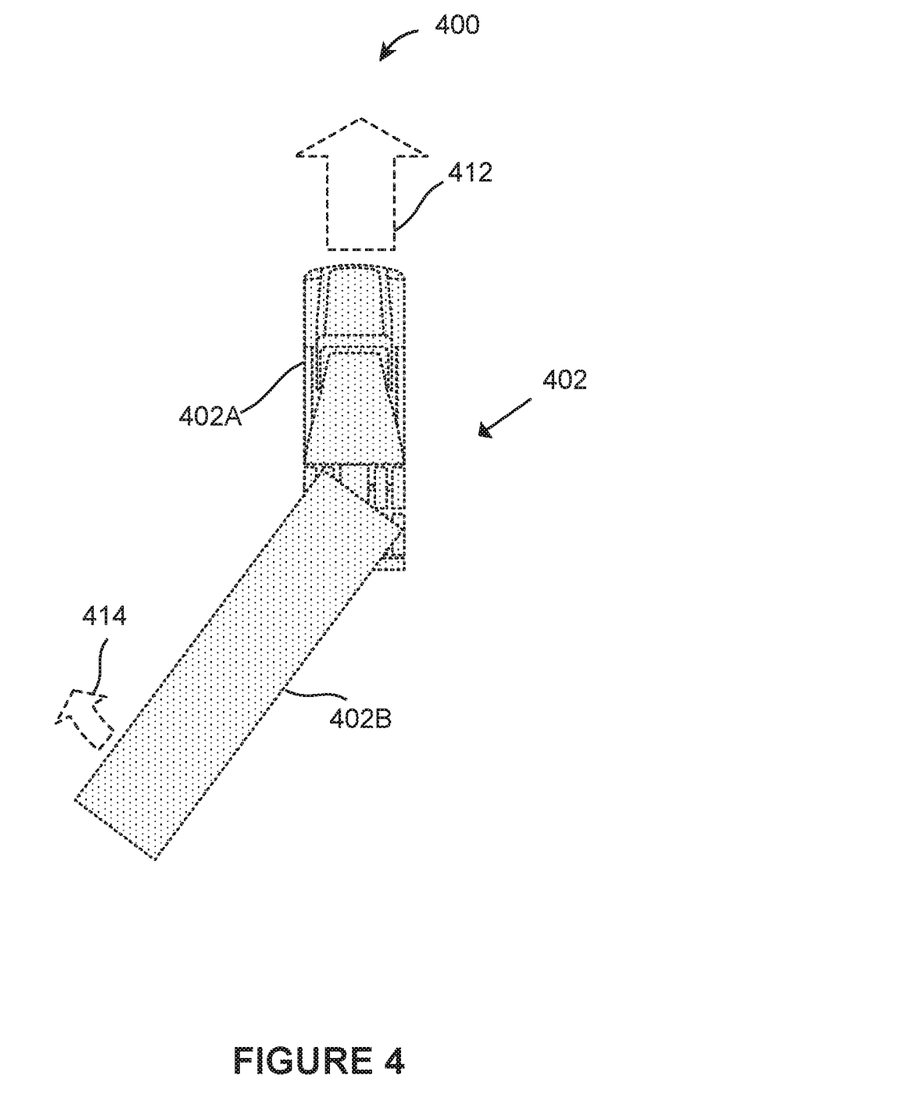
FIG. 4 illustrates example behaviors of a moving object, in accordance with various embodiments.

FIG. 4 illustrates example behaviors of a moving object, in accordance with various embodiments. Behaviors 400 may include behaviors of a vehicle 402 that was not observed in generating training information. For example, LIDAR and/or imaging techniques may have been used to observe the behaviors of the vehicle 402 on the road. The behaviors 400 may include those behaviors of the vehicle 402 that was not actually observed, such as rare and/or dangerous behaviors of the vehicle 402. For instance, the vehicle 402 may include a tractor portion 402A and a trailer portion 402B. The behaviors 400 may include the tractor portion 402A moving in a forward direction (a behavior 412) and the trailer portion 402B swinging to the side (a behavior 414). That is, the behavior 400 may include different parts of the vehicle 402 moving differently. As another example, the behavior 400 may include the tractor portion 402A swinging to the side and becoming decoupled from the tractor portion 402A and/or other load(s)/portion(s) of the vehicle 402 coming off the vehicle 402 (e.g., flying off the vehicle 402). Such behaviors may be dangerous to the vehicle 402, vehicles and/or other objects around the vehicle 402, and/or the surrounding of the vehicle 402.

Such behaviors of the vehicle 402 may be difficult to observe because they may be rare and/or because they may be dangerous. Behavior information characterizing the behaviors 400 may be determined based on simulation of the vehicle 402. For example, observed behavior of the vehicle 402 moving in a forward direction may be modified to include the trailer portion 402B swinging to the side. As another example, a three-dimensional model of the vehicle 402 may be moved in accordance with the behaviors 400 to determine the behavior information. The behavior information may be used to enhance training information, which may in turn be used to configure tools (e.g., self-driving tools) to deal with occurrences of the behaviors 400.

Figure 5:
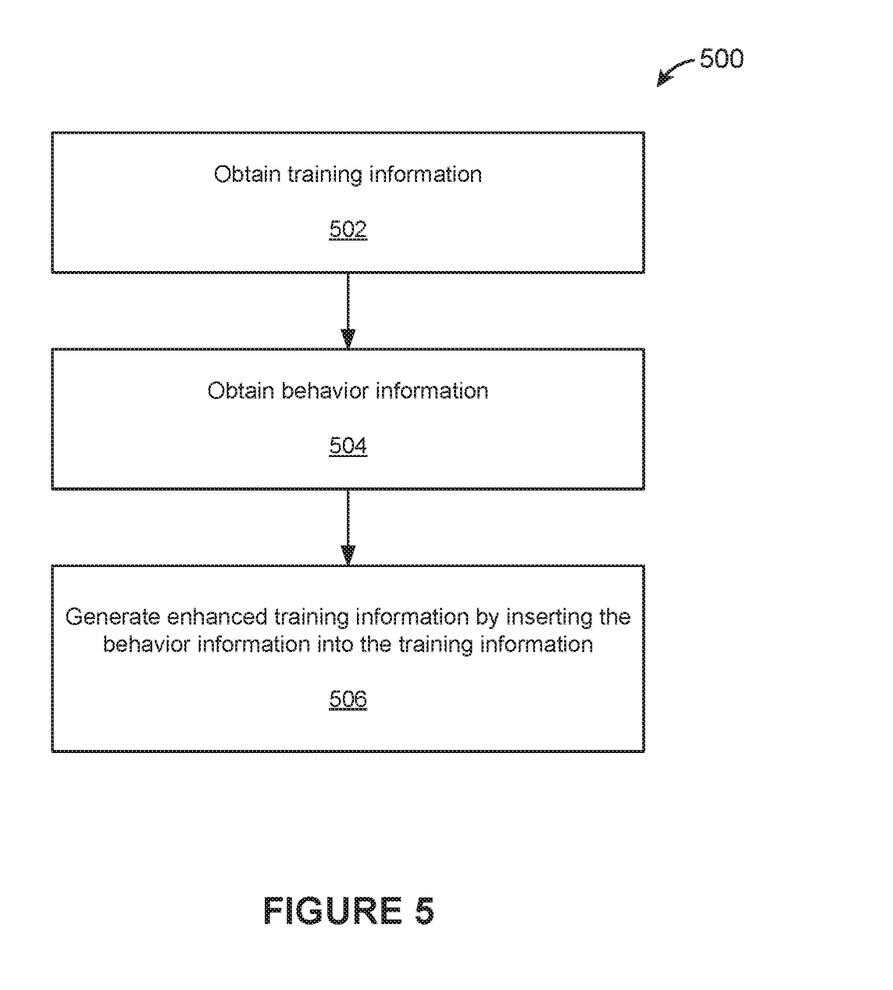
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, training information may be obtained. The training information may characterize behaviors of moving objects. The training information may be determined based on observations of the behaviors of the moving objects. At block 504, behavior information may be obtained. The behavior information may characterize a behavior of a given object. At block 506, enhanced training information may be generated by inserting the behavior information into the training information.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
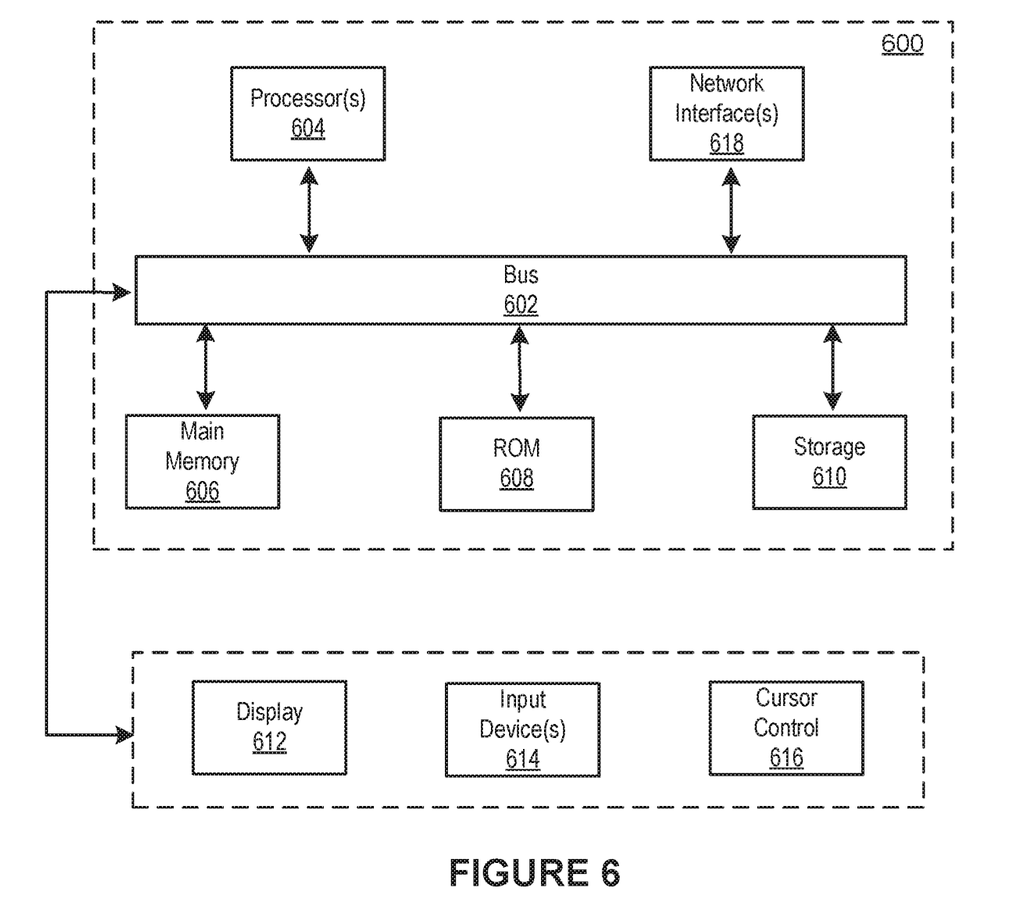
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
obtaining training information, the training information characterizing behaviors of moving objects, the training information determined based on observations of the behaviors of the moving objects;
obtaining behavior information, the behavior information characterizing a behavior of a given object; and
generating enhanced training information at least in part by inserting the behavior information into the training information, wherein inserting the behavior information into the training information comprises inserting the behavior information based at least in part on a frequency of occurrence of the behavior of the given object.

2. The system of claim 1, wherein the behavior of the given object includes a rare behavior of the given object.

3. The system of claim 2, wherein the rare behavior of the given object is not characterized by the training information.

4. The system of claim 2, wherein the training information defines a three-dimensional point cloud model of a scene and one or more images of the scene.

5. The system of claim 4, wherein the behavior information characterizing the behavior of the given object includes the behavior information defining a three-dimensional point cloud model of motions of the given object.

6. The system of claim 4, wherein the given object includes a person, an animal, or a vehicle.

7. The system of claim 1, wherein the enhanced training information is used to train a machine learning model.

8. The system of claim 7, wherein the machine learning model is used to control motions of a vehicle.

9. The system of claim 1, wherein the behavior of the given object comprises an observed behavior of a first portion of the given object and a simulated behavior of a second portion of the given object, and wherein obtaining the behavior information comprises:
obtaining a first portion of the behavior information corresponding to the observed behavior of the first portion of the given object;
generating a second portion of the behavior information at least in part by simulating the simulated behavior of the second portion of the given object; and
modifying the first portion of the behavior information with the second portion of the behavior information.

10. A method implemented by a computing system including one or more processors and storage media storing machine-readable instructions, wherein the method is performed using the one or more processors, the method comprising:
obtaining training information, the training information characterizing behaviors of moving objects, the training information determined based on observations of the behaviors of the moving objects;
obtaining behavior information, the behavior information characterizing a behavior of a given object; and
generating enhanced training information by inserting the behavior information into the training information, wherein inserting the behavior information into the training information comprises inserting the behavior information based at least in part on a frequency of occurrence of the behavior of the given object.

11. The method of claim 10, wherein the behavior of the given object includes a rare behavior of the given object.

12. The method of claim 11, wherein the rare behavior of the given object is not characterized by the training information.

13. The method of claim 11, wherein the training information defines a three-dimensional point cloud model of a scene and one or more images of the scene.

14. The method of claim 13, wherein the behavior information characterizing the behavior of the given object includes the behavior information defining a three-dimensional point cloud model of motions of the given object.

15. The method of claim 13, wherein the given object includes a person, an animal, or a vehicle.

16. The method of claim 10, wherein the enhanced training information is used to train a machine learning model.

17. The method of claim 16, wherein the machine learning model is used to control motions of a vehicle.

18. The method of claim 10, wherein the behavior of the given object comprises an observed behavior of a first portion of the given object and a simulated behavior of a second portion of the given object, and wherein obtaining the behavior information comprises:
obtaining a first portion of the behavior information corresponding to the observed behavior of the first portion of the given object;
generating a second portion of the behavior information at least in part by simulating the simulated behavior of the second portion of the given object; and
modifying the first portion of the behavior information with the second portion of the behavior information.

19. A non-transitory computer readable medium comprising instructions that, when executed, cause one or more processors to perform:
obtaining training information, the training information characterizing behaviors of moving objects, the training information determined based on observations of the behaviors of the moving objects;

obtaining behavior information, the behavior information characterizing a behavior of a given object; and generating enhanced training information by inserting the behavior information into the training information, wherein inserting the behavior information into the training information comprises inserting the behavior information based at least in part on a frequency of occurrence of the behavior of the given object.

20. The non-transitory computer readable medium of claim 19, wherein the behavior of the given object includes a rare behavior of the given object, the rare behavior of the given object not characterized by the training information.

* * * * *